(12) United States Patent
Cox (10) Patent No.: US 11,807,147 B2
(45) Date of Patent: Nov. 7, 2023

(54) ACCESSORY MOUNTING TO A RECREATIONAL VEHICLE

(71) Applicant: Seth Cox, Kendallville, IN (US)

(72) Inventor: Seth Cox, Kendallville, IN (US)

( * ) Notice: Subject to any disclaimer, the term of this patent is extended or adjusted under 35 U.S.C. 154(b) by 194 days.

(21) Appl. No.: 16/974,416

(22) Filed: Jan. 25, 2021

(65) Prior Publication Data

US 2022/0234485 A1    Jul. 28, 2022

(51) Int. Cl.
*B60N 3/16* (2006.01)
*B60R 11/00* (2006.01)

(52) U.S. Cl.
CPC ............. *B60N 3/16* (2013.01); *B60R 11/00* (2013.01); *B60R 2011/004* (2013.01); *B60R 2011/0064* (2013.01); *B60R 2011/0084* (2013.01)

(58) Field of Classification Search
CPC ..... B60N 3/16; B60R 11/00; B60R 2011/004; B60R 2011/0064; B60R 2011/0084; B60P 3/36
See application file for complete search history.

(56) References Cited

U.S. PATENT DOCUMENTS

| | | | | | |
|---|---|---|---|---|---|
| 5,263,467 | A | * | 11/1993 | Jones | A47J 37/0713 126/42 |
| 5,518,156 | A | * | 5/1996 | Lehman | B60P 3/36 224/512 |
| 5,881,937 | A | * | 3/1999 | Sadler | B60R 9/06 224/527 |
| 6,354,286 | B1 | * | 3/2002 | Davis | A47J 37/0871 126/30 |
| 6,463,686 | B1 | * | 10/2002 | Eisenbraun | B60D 1/60 280/507 |
| 6,467,417 | B1 | * | 10/2002 | Guyot | B60P 3/14 108/44 |

(Continued)

FOREIGN PATENT DOCUMENTS

| | | | |
|---|---|---|---|
| AU | 2013231042 B1 | * 10/2014 | |
| AU | 2021104189 A4 | * 9/2021 | |
| WO | WO-0234570 A2 | * 5/2002 | .............. B60D 1/485 |

OTHER PUBLICATIONS

Jayco JayPort, Published Jan. 23, 2021, jayco.com/blog/jayport, accessed Dec. 20, 2022.*

Primary Examiner — James A Shriver, II
Assistant Examiner — Michael T. Walsh
(74) Attorney, Agent, or Firm — Ryan M Fountain (57) ABSTRACT

An accessory mounting arrangement is provided for vehicles wherein a removable accessory is mounted to the vehicle via a projecting arm which is slidably received within a tubular element, attached to the chassis and floor structure of the vehicle along a vehicle side, and abutting a structural wall which limits sliding motion of the projecting arm. Preferably, the tubular element is formed as a conventionally sized hitch receiver, and the projecting arm is telescopically received in the tubular element at one end of the arm, while the other end of the arm includes a vertical adjustment structure which supports a platform for positively locating and supporting devices for supplemental function, such as a bar-b-que grill. Multiple tubular elements can be so mounted along the side of the vehicle, so as to provide multiple alternative and cooperative accessory ports, and removable covers are provided for aesthetic benefits when a given port is not in use.

12 Claims, 11 Drawing Sheets

(56) References Cited

U.S. PATENT DOCUMENTS

| | | | | |
|---|---|---|---|---|
| 7,281,646 | B2 * | 10/2007 | Flannery | B60R 9/06 224/512 |
| 8,485,207 | B1 * | 7/2013 | Boyington | E04H 15/06 280/505 |
| 8,783,536 | B1 * | 7/2014 | Julian | B60R 9/06 224/495 |
| 2002/0148940 | A1 * | 10/2002 | Lee | F16M 13/02 248/352 |
| 2012/0266786 | A1 * | 10/2012 | Wyman | B60N 3/002 108/44 |
| 2019/0248425 | A1 * | 8/2019 | Turner | A47B 37/04 |

\* cited by examiner

ACCESSORY MOUNTING TO A RECREATIONAL VEHICLE

BACKGROUND OF THE INVENTION

The present invention relates generally to structural arrangements for mounting accessories to vehicles, and more particularly, to recreational vehicles ("RVs"), such as travel trailers, toy haulers, fifth wheel trailers, motor homes, and like vehicles having at least living quarters therein (and as otherwise defined by the Recreational Vehicle Industry Association). Additional information about RVs can be found on the internet at www.rvia.orq.

RVs are typically versatile vehicles which may be used for concurrently or separately hauling or storing equipment, other vehicles, personal property, people, and animals. RVs are often used for camping and/or recreation, or as temporary living quarters for an extended period of time. As such, a number of accessories, including accessories of different types, can be employed with a RV in order to enhance the functionality and attractiveness of the RV. It is often desirable and/or advantageous to mount accessories directly to the exterior of the RV, either for storage or use. Such accessories include bar-b-que grills, stoves, kitchenettes, hammocks, tables, seating, storage racks, televisions, audio entertainment systems, and the like.

At the same time, a RV is a vehicle, and must be suitable for travel on roads and highways. Certain accessories cannot be safely or efficiently mounted to the vehicle when it is moving. Accordingly, it is typically desirable that accessories be selectively removable from the RV, and with relative ease by a typical RV user. Removability is also desirable for certain types of accessories, since it facilitates cleaning and/or maintenance of that accessory.

Further, RVs are often used in campgrounds and wilderness environments where the ground is uneven or sloped, even with respect to the ground adjacent the RV where the accessory would be in use. In such situations, certain accessories and/or the RV must accommodate elevational variations in order for optimal accessory use. Similarly, since the ground adjacent to the RV is exposed to weather, the RV and/or certain accessories typically must accommodate the impact of weather conditions, which produce mud and/or snow on the ground, and rain, high winds, etc. in the area of accessory use.

Also, RVs are usually manufactured according to certain prescribed floor plans, and on specific framework and chassis structure. Accordingly, mounting structure for supporting accessories typically can only be securely placed at certain locations on the exterior of the RV. Further, over the useful life of a given RV, it may be desirable to use a wide variety of different accessories on its exterior. However, at the time of its manufacture, which accessories the end user may desire to employ are not known. Accordingly, it is most efficient to form mounting structure for supporting accessories such that it can accommodate a wide variety of different types of accessories.

To some extent, prior devices have succeeded in achieving these requirements by the use of standard towing hitch receivers to support certain types of accessories, such as those found on pick-up trucks to mount bar-b-que grills, bicycle racks, storage boxes and the like. However, bumper mounting of accessories is not always a desirable location, since the accessory cannot take advantage of the placement of other accessories and RV features, such as adjacent storage compartments, entry doors, and protective awnings (typically mounted only on the sides of an RV), and extension of feed lines of electricity, water, fuel and the like, as well as any drain lines, are more costly, if not precluded by other structural requirements of the RV. Further, bumper mounting of accessories can interfere with other RV features, such as the ramp door of a toy hauler-type of RV. In addition, certain accessories, such as tables and hammocks, can require multiple mounting points on the vehicle, not merely a single hitch receiver.

Further complications with respect to commercial acceptability of accessory mounting arrangements arise when the vehicular nature of the RV is taken into account. In order to avoid adverse impact on fuel economy, all additions to RV structure must minimize weight requirements and avoid impairment of the other structural integrity of the RV. Also, overall vehicular cost is a serious restriction on the structure usable for accessory mounting. At the same time, the accessory mounting structure needs to be sufficiently robust to provide the necessary safety when the accessory is being used.

In addition, certain accessories have special use limitations which must be taken into account in construction of the mounting arrangement. For example, gas grills produce heat during use which can adversely affect the RV is the gas grill is mounted too close to the RV. Accordingly, prior gas grills have typically included a substantial heat shield between the flame and the wall of the RV to which it is mounted and/or have required the use of spacing structure to keep the grill a pre-set distance from the RV. Also, gas grills typically use a fuel line connected to the fuel supply in the RV, and that fuel line must be protected from inadvertent adverse contact during use (such as by users tripping over or snagging an exposed fuel line when the grill is set up for use).

Another important consideration with respect to accessory mounting structure is the aesthetic acceptability of the structure during non-use. RVs are often specifically designed for attractive exterior appearance, and the commercial value of an RV can easily be degraded by incongruous application of exterior structure. This is especially true where that structure is not protected from adverse deterioration over time (such as by weather rusting of a conventional hitch receiver).

OBJECTIVES OF THE INVENTION

Accordingly, a primary objective of the invention is to provide improved accessory mounting arrangements for vehicles, such as RVs. These improvements include providing such arrangements which:
 a. are inexpensive to manufacture, install, maintain, and repair,
 b. increase floor plan optimization when used in a vehicle, such as an RV,
 c. minimize component weight,
 d. accommodate a variety of different accessories,
 e. increase accessory accessibility and vehicle user convenience,
 f. permit multiple accessory mountings on a vehicle,
 g. facilitate mounting accessories on the sides of vehicles, and.
 h. increase the aesthetic appeal of RVs.

SUMMARY OF THE INVENTION

These and other objectives of the present invention are achieved by the provision of an accessory mounting arrangement for vehicles wherein a removable accessory is mounted to the vehicle via a projecting arm which is slidably received within a tubular element, attached to the chassis and floor structure of the vehicle along a vehicle side, and abutting a structural wall which limits sliding motion of the projecting arm. Preferably, the tubular element is formed as a conventionally sized hitch receiver, and the projecting arm is telescopically received in the tubular element at one end of the arm, while the other end of the arm includes a vertical adjustment structure which supports a platform for positively locating and supporting devices for supplemental function, such as a bar-b-que grill. Multiple tubular elements can be so mounted along the side of the vehicle, so as to provide multiple alternative and cooperative accessory ports, and removable covers are provided for aesthetic benefits when a given port is not in use.

Other objects, advantages, and novel features of the present invention will become readily apparent from the following drawings and detailed description of certain preferred and alternative embodiments.

DETAILED DESCRIPTION OF PREFERRED EMBODIMENTS

The figures show schematically, and in best mode versions, embodiments of the present invention, as applied to a fifth wheel travel trailer-type of RV, both generically and specifically. The drawings are not to scale from one view to the next.

The following numbered and lettered features are illustrated in the drawings:

Vehicle 10, having:
  front 12,
  rear 14,
  first opposing side 16 (left hand side as viewed from the vehicle front),
  second opposing side 18 (right hand side as viewed from the vehicle front),
  top 20,
  bottom 22 (or underside),
  towing hitch 24,
  tires 26,
  chassis frame 28, having:
    lower flange 29,
    upper flange 29a
  floor frame 30,
Ground G,
Spaced apart distance D (selected to be sufficient to avoid adverse impact of use of the supplemental function apparatus upon vehicle 10),
Conduit receiver for gas, electric power, or water 32, leading to interior vehicular supply,
An accessory mounting arrangement, comprising:
  a tubular receiver 40 (connected to first opposing side 16 of vehicle 10, mounted to chassis frame 28, mounted to floor frame 30), having:
    First open end 42,
    Second open end 44,
    First longitudinal length L1 between first end and second end
  a mounting assembly for tubular receiver, having:
    L shaped wall plate 46 (or, alternatively, a flat plate)(removably or fixed to I beam), having optional apertures 47,
    outer end plates 48,
    L shaped hanger bracket 52, having top plate 53,
    fastener bolt 54,
    fastener nut 56,
An accessory 70 (removably mounted to vehicle 10) having:
  extending element 72 (removably received and closely fitting within the tubular receiver), having:
    a first end 74,
    a second end 76,
    a second longitudinal length L2 between first end and second end,
    elevational adjustment means, having
      second tubular receiver 78, having
        apertures 80,
        Elevational fasteners 82,
      flexible conduit or hose 84, such as for gas, electric power, or water,
      conduit fittings 86,
      platform 88, having
        apertures 90,
        extending arm 92, having
        apertures 94,
Supplemental function apparatus 96, to be mounted on platform 88, such as a bar-b-que grill, having:
  control knobs 98
  lower projections or supporting feet 100 closely received within apertures 90,
Wall fitting 50 with opening sufficiently large to receive extending element 72 therethrough, having
  hinged or movable cover 60, and
Chamfer edge 62, on especially preferred embodiments of tubular receiver 40.

In general, the present invention may be applied to any vehicle, but the illustrations for a RV shows the connection of the tubular receiver to multiple locations, adjacent each end of the tubular receiver, one to the chassis and one to the floor frame as illustrated. Alternatively, a cantilevered connection of the tubular receiver is acceptable for the present invention where that connection is sufficient and safe for the weight and use of the accessory and the supplemental function apparatus to be supported thereon. L shaped wall plate 46 can be secured to the chassis frame by welding or by conventional fasteners through apertures 47. Where a flat plate is used instead of that L shaped plate, the chassis frame can form the end wall which the tubular receiver abuts against at its first open end 42, and that end wall serves as a stop for movement of extending element 72 into tubular receiver 40, instead of the vertical wall of plate 46.

In addition, the figures show the present invention being available at multiple locations along the RV side, so as to support a different accessory arrangement at each location and/or provide alternative locations for a given accessory arrangement and/or to provide multiple support locations for a single accessory arrangement (such as a fully supported hammock, bench, or table).

Although the figures show supplemental function apparatus 96 to be a grill, the present invention contemplates a wide variety of other devices, being alternatively employed, either supported directly on platform 88 or directly on extending arm 92 or directly on second tubular receiver 78 or directly on extending element 72, according to the shape and purpose of that device. Such devices can include, for example, hammocks, tables, benches, stoves, kitchenettes, televisions, audio entertainment centers, and the like. Similarly, the shape, number and size of apertures 90 on platform 88 can be readily adapted to corresponding projections on such devices, so as to restrict sliding or inadvertent movement of such devices when supported on platform 88. Also, conduit 84 is shown in the figures to be a gas fuel line having conventional connection fittings 86 for use with a convention conduit receiver 32, the present invention contemplates use of whatever support lines are needed for the supplemental function apparatus, such as water, electricity, air, and the like. The orientation of the present invention and the use of extending element 72 serve to protect conduit 84 from inadvertent or unintentional interaction with users and the environment. Further, the positive location of supplemental function apparatus 96 on platform 88 can prevent inadvertent damages to conduit 84, such as might otherwise occur if apparatus slid off of platform 88.

Figure 1:
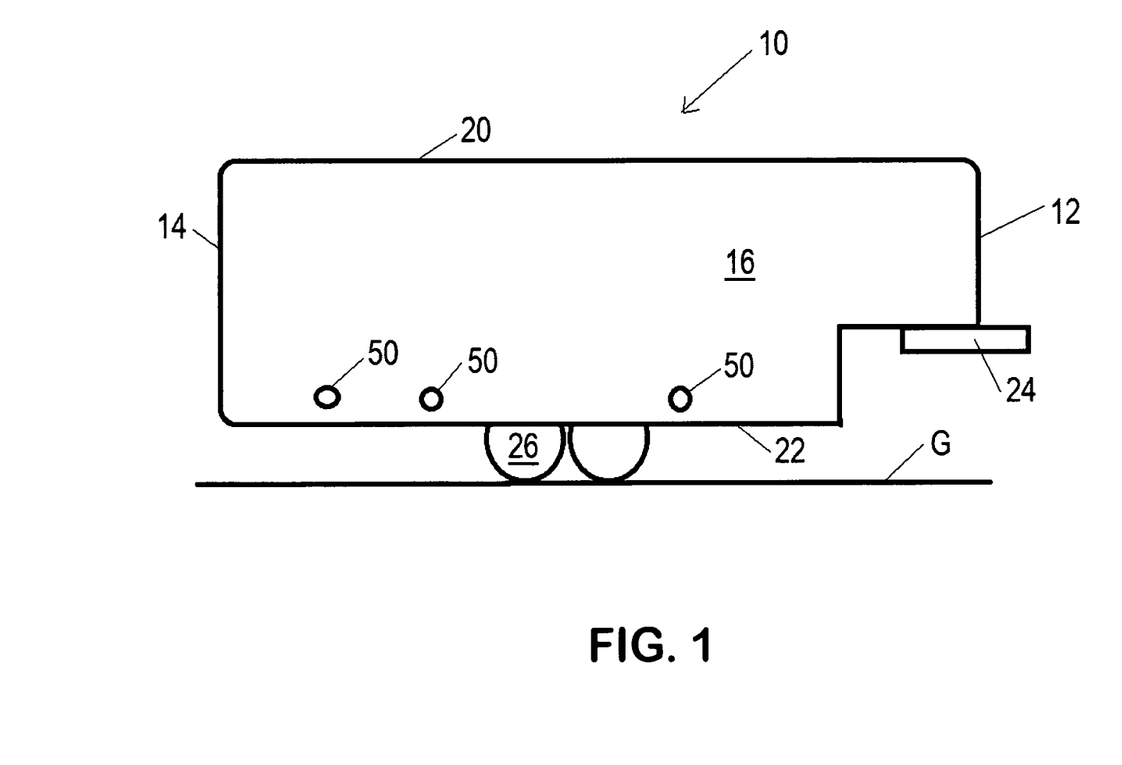
FIG. 1 is a schematic side view of a fifth wheel-type travel trailer incorporating a preferred embodiment of the present invention, with the accessory elements removed.
Figure 2:
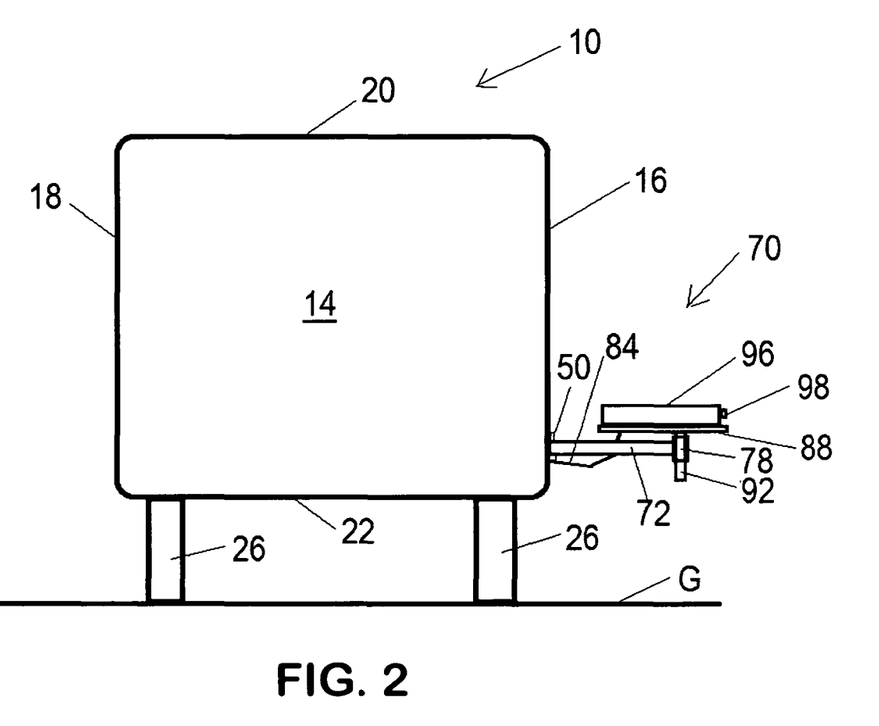
FIG. 2 is a schematic rear view of the travel trailer of FIG. 1 with a preferred embodiment of the accessory elements installed.
Figure 3:
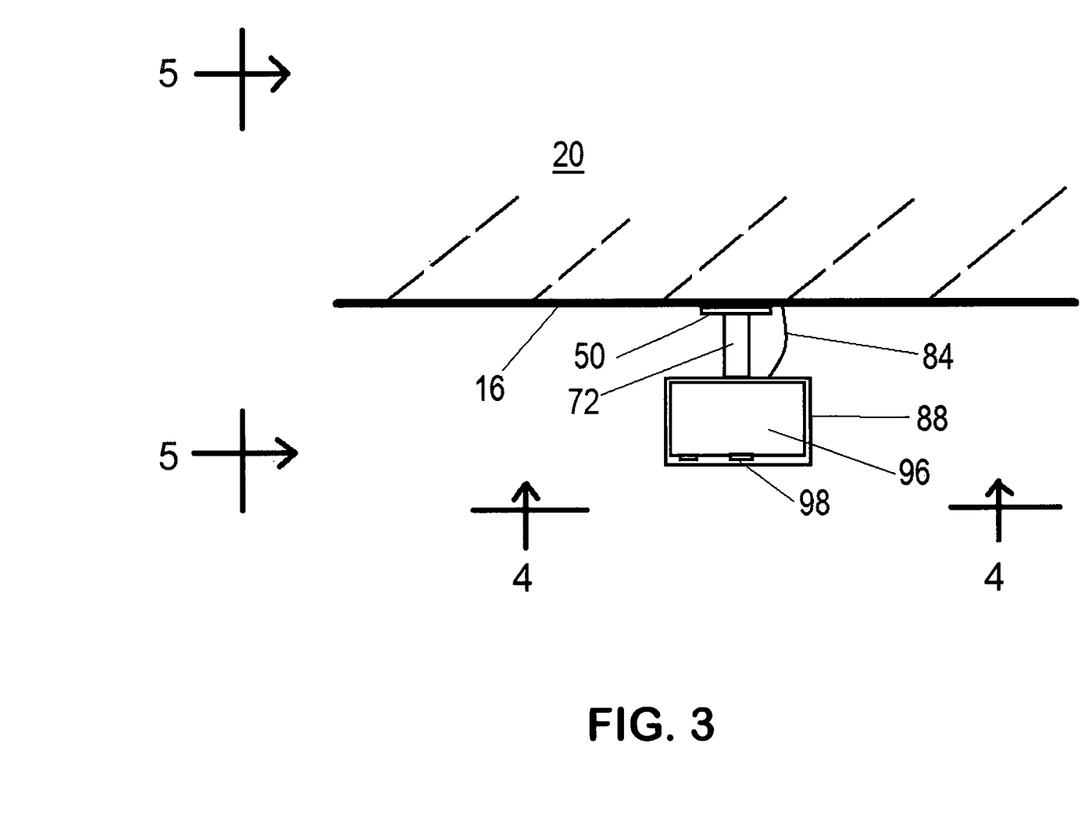
FIG. 3 is a schematic top view of a portion of the travel trailer of FIG. 2.
Figure 4:
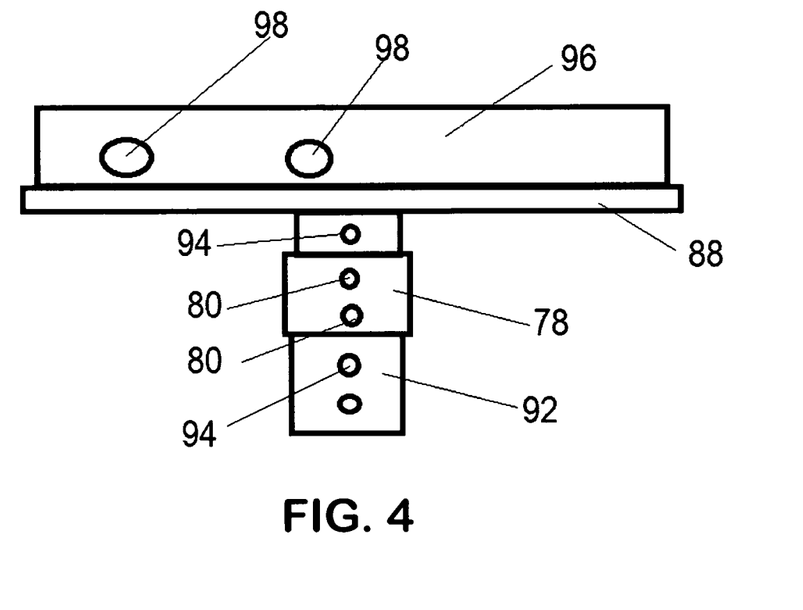
FIG. 4 is a schematic side view of the accessory elements along lines 4-4 of FIG. 3 with elevational fasteners removed for clarity.
Figure 5:
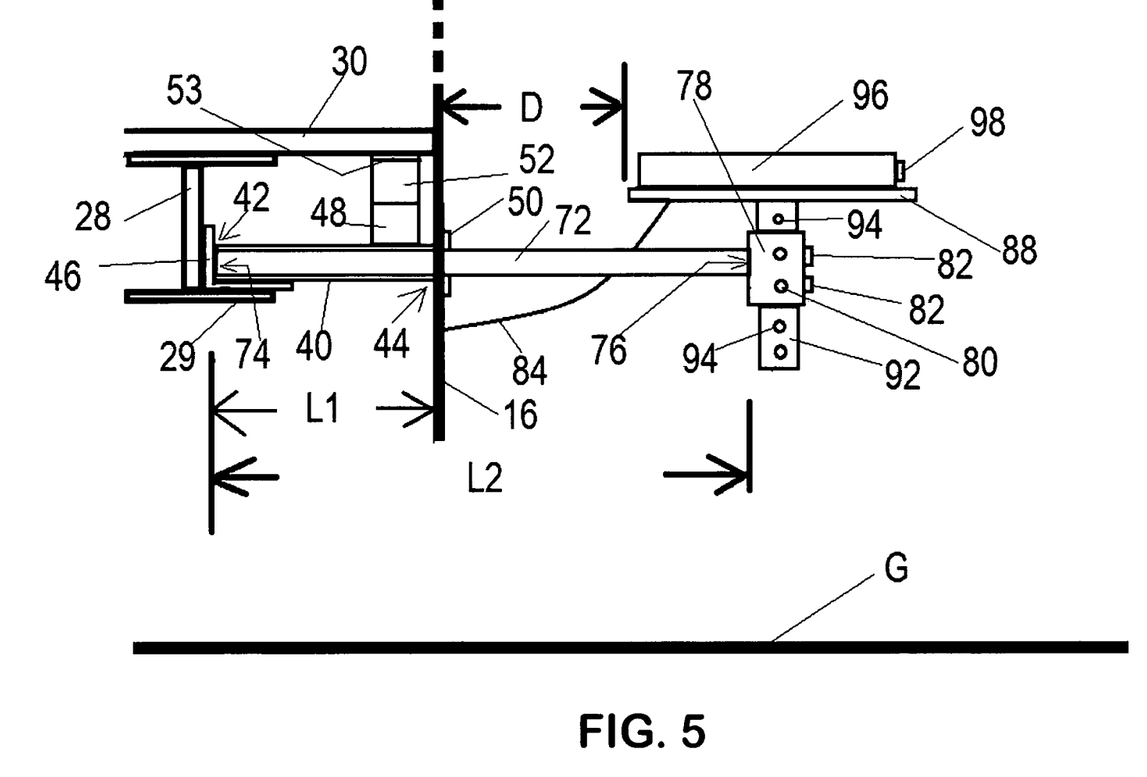
FIG. 5 is an enlarged schematic cross-sectional view from of a portion of the travel trailer of FIG. 2 along lines 5-5 of FIG. 3.
Figure 6:
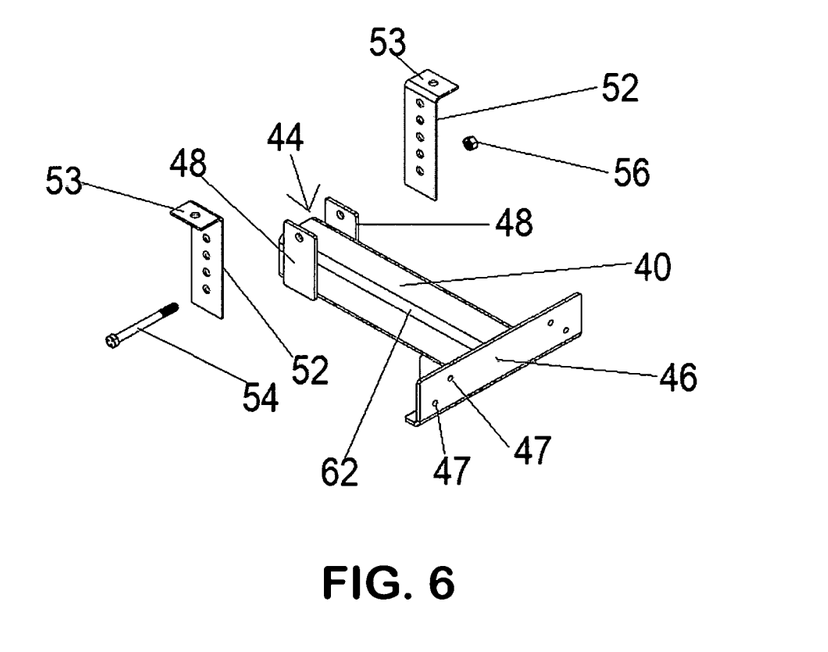
FIG. 6 is an upper, second opposing side, front perspective view of the tubular receiver assembly of a preferred embodiment of the present invention.
Figure 7:
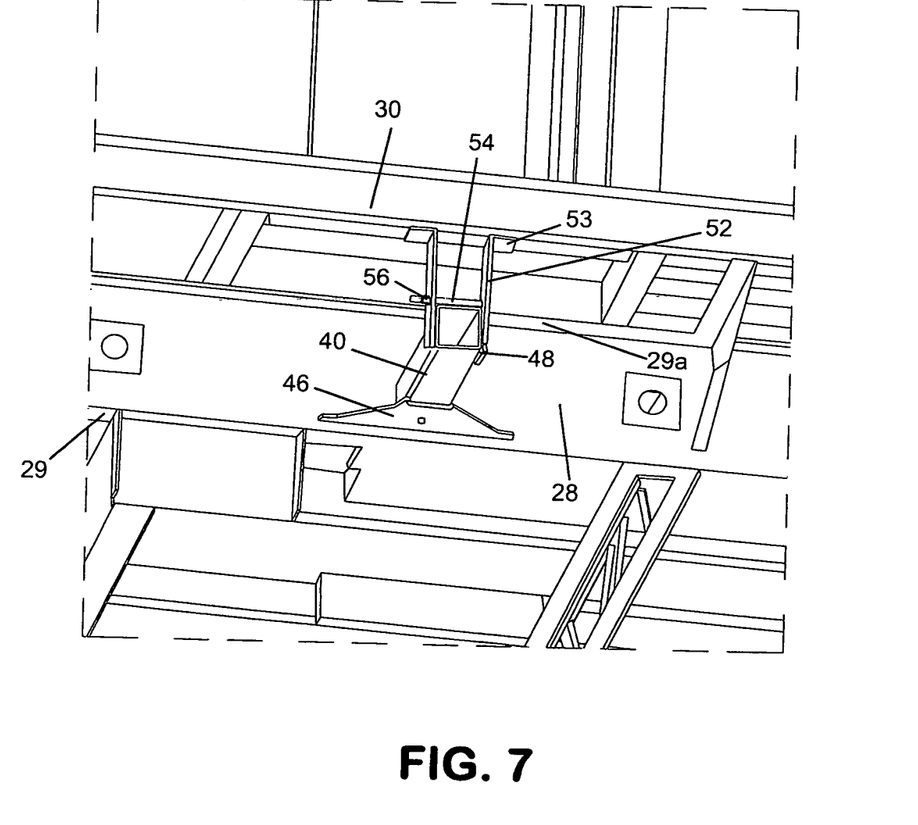
FIG. 7 is a lower, first opposing side, rear perspective view of the tubular receiver assembly of FIG. 6 as mounted to structural elements of a travel trailer.
Figure 8:
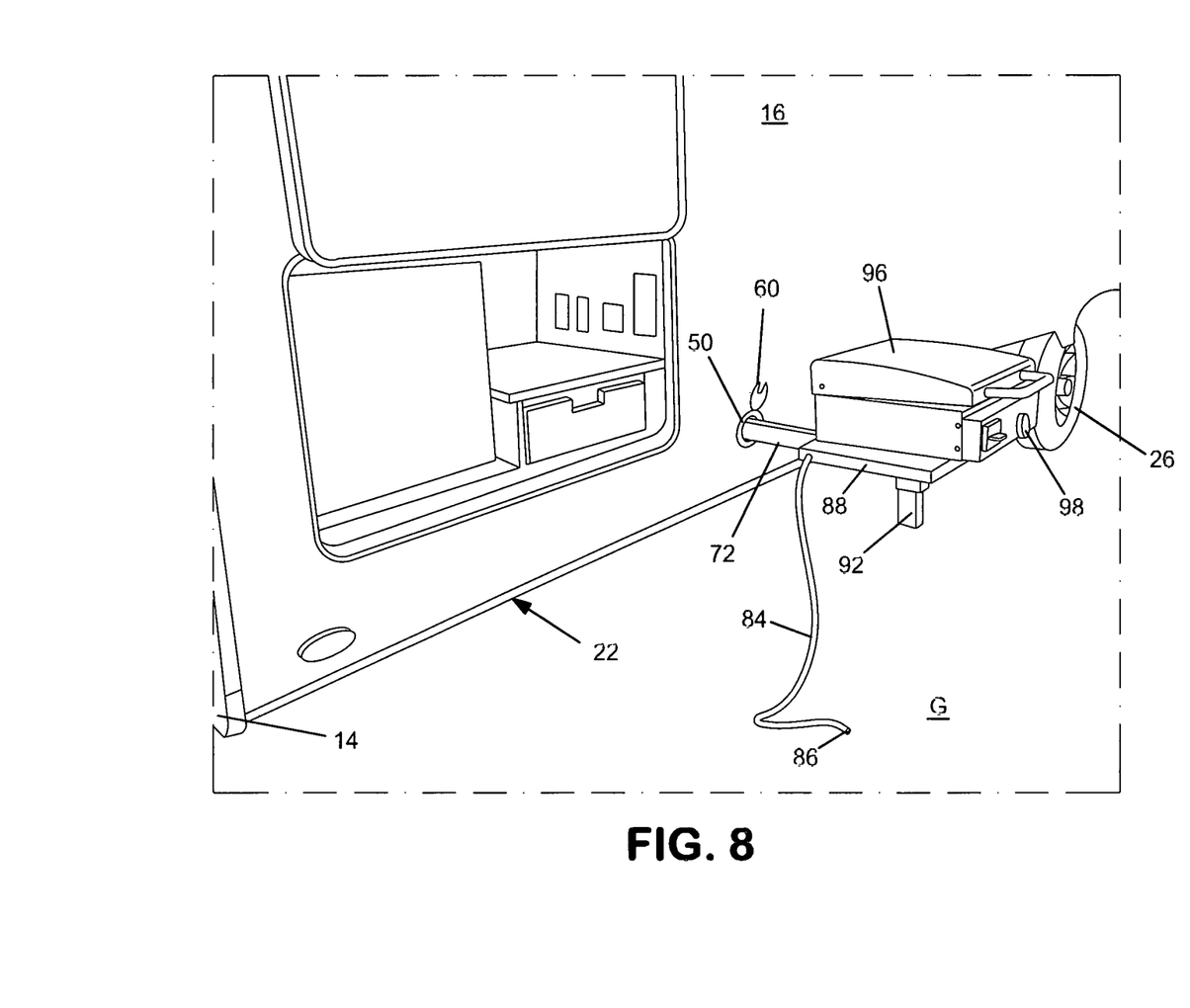
FIG. 8 is an upper, first opposing side, rear perspective view of a travel trailer having a preferred embodiment of the present invention with the accessory elements installed.
Figure 9:
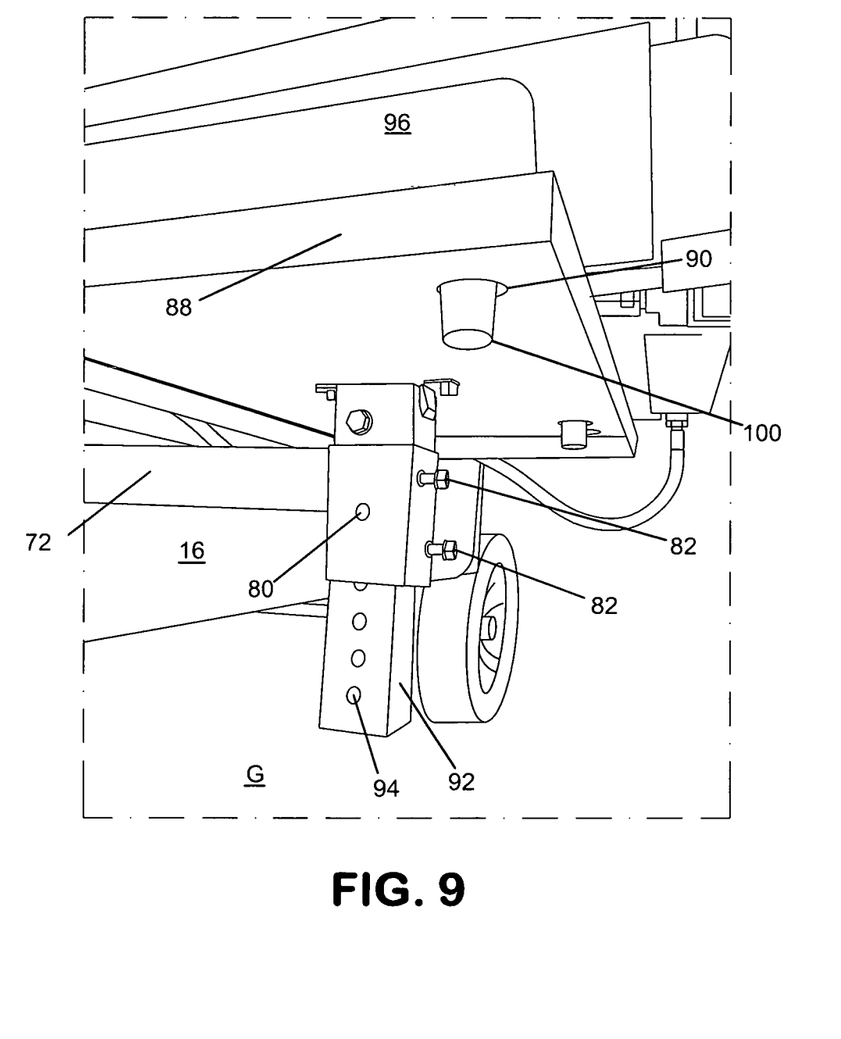
FIG. 9 is an enlarged, lower, first opposing side, rear perspective view of a portion of the present invention shown in FIG. 8.
Figure 10:
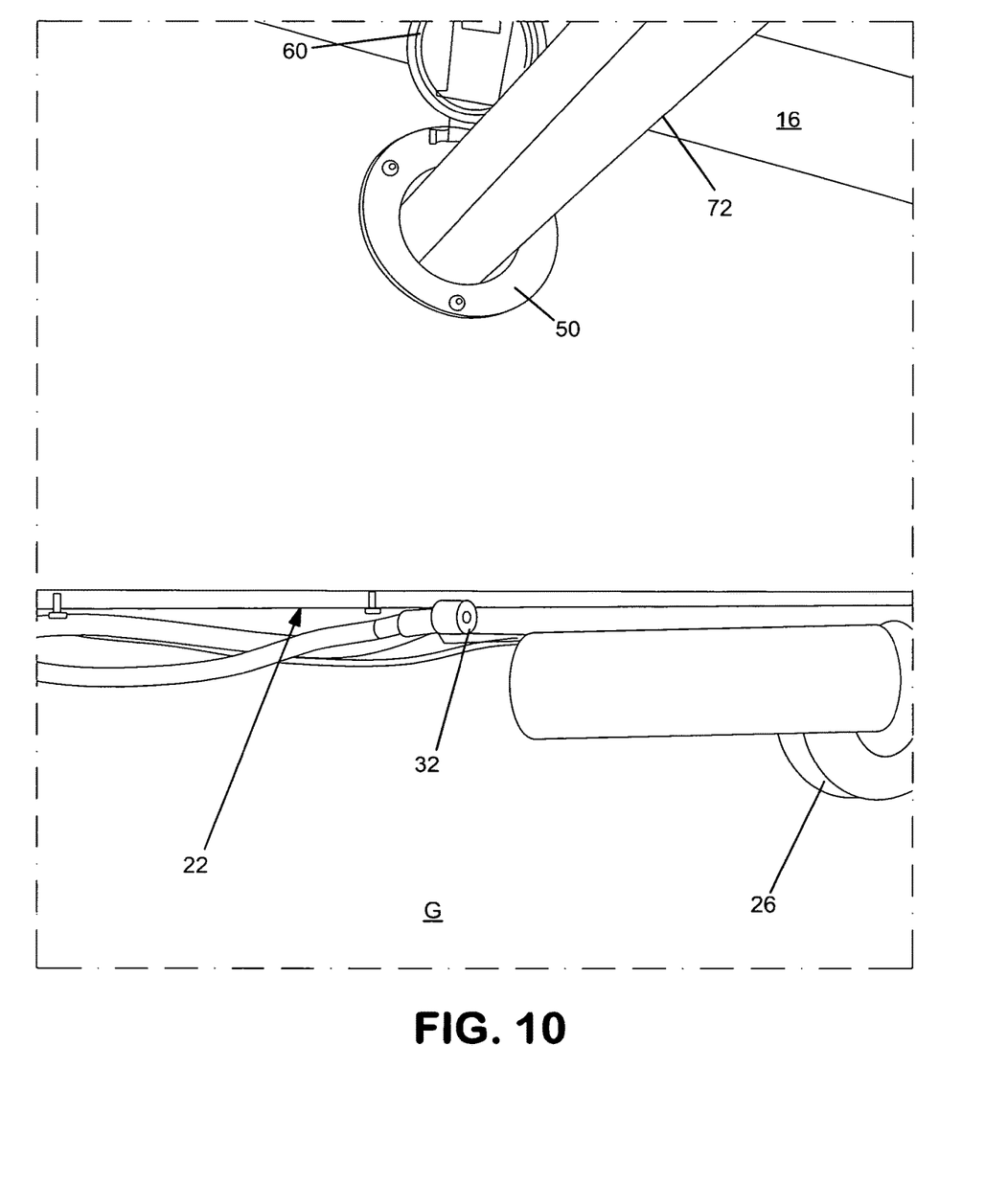
FIG. 10 is an enlarged, lower, first opposing side, rear perspective view of another portion of the present invention shown in FIG. 8 with the conduit fitting to the travel trailer disconnected.
Figure 11:
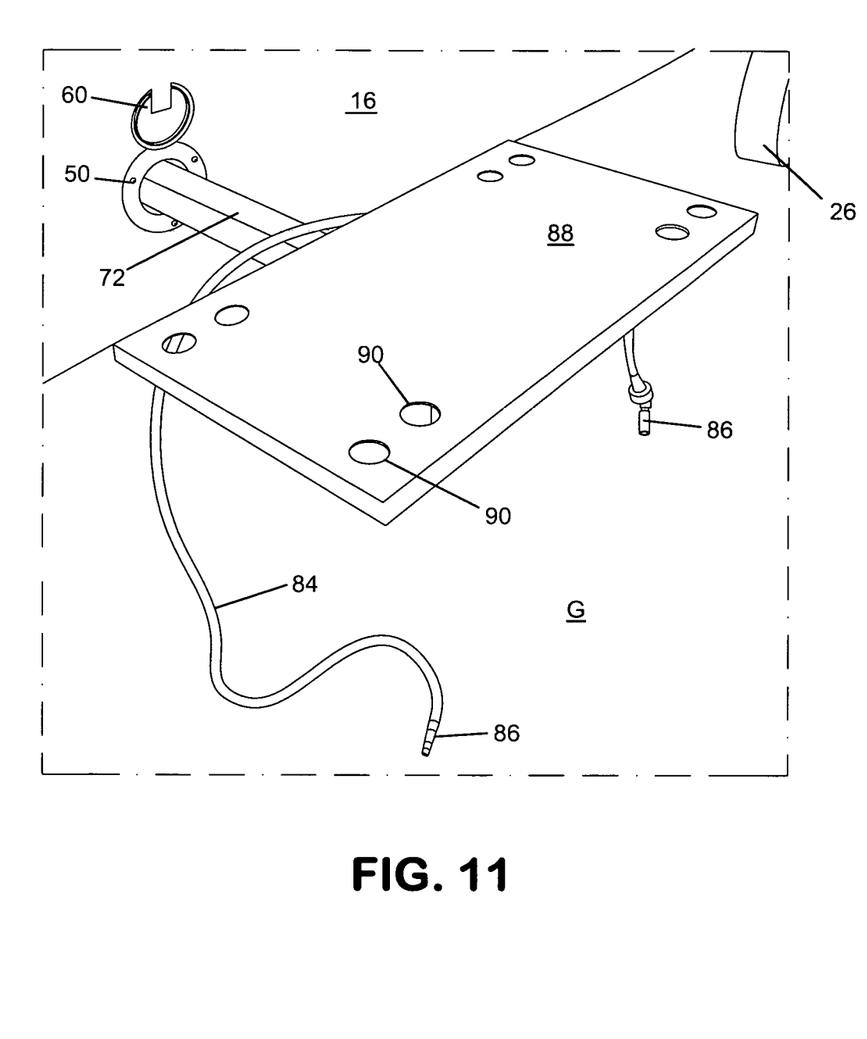
FIG. 11 is an enlarged, upper first opposing side rear perspective view of the portion of the present invention shown in FIG. 10 with the grill removed and the conduit fittings disconnected.

Elevational fasteners 82 are preferably conventional in nature, being, for example, threaded bolts or pins to support the relative positions of extending arm 92 with respect to second tubular receiver 78, through the alignable apertures 80 and 94 in each of those elements. In the embodiment shown in FIGS. 8 and 9, second tubular receiver is connected to extending element 72 by welding toward one end of the second tubular receiver, rather than at its longitudinal midpoint, thus forming a unitary, L shaped member. Where additional vertical adjustability of platform 88 is desired, this unitary, L shaped member can be slid out of tubular receiver 40 and flipped or rotated upwards 180 degrees (about the axis of length L2) from the orientation shown in FIG. 9, so as to provide higher connectivity of extending arm 92 within second tubular receiver 78.

Wall fitting 50 preferably allows the accessory receiving structure to be substantially flush with the exterior surface of the vehicle, and yet readily accessible when needed by the hinged connection of cover 60. Alternatively, cover 60 can be snap fit or threaded to fitting 50, as desired in a given application.

Although the present invention has been shown and described herein with respect to certain preferred embodiments and alternative configurations, those were by way of illustration and example only. For example, tubular receiver is illustrated as resembling a conventional hitch receiver tube in its configuration and dimensions. However, the present invention expressly contemplates other configurations for that receiver, such, as a round tube or U-shaped (open top) tube cross-sectional shape. Accordingly, the spirit and scope of the present invention is intended to be limited only by the terms of the appended claims.

What is claimed is:

1. An accessory mounting arrangement, for a vehicle having a front, a rear, and first and second opposing sides between the front and rear, said arrangement comprising:
   a tubular receiver which is connected to said first opposing side of the vehicle, and
   an accessory adapted to be removably mounted to said vehicle, having
      an extending element, formed so as to be removably received and closely fitting within said tubular receiver, and wherein:
   said tubular receiver supports said accessory at a location spaced apart from said first opposing side by a fixed distance when said extending element is fully inserted within said tubular receiver,
   the tubular receiver includes first and second open ends separated by a first longitudinal length,
   the tubular receiver is mounted to said vehicle by abutting said first end to a structural wall of said vehicle,
   the extending element is formed to have a second longitudinal length from a first end thereof, which is greater than the first longitudinal length, and
   said fixed distance is established by full insertion of said extending element into said second open end of said tubular receiver until said first end thereof abuts said wall of said vehicle.

2. The arrangement according to claim 1 wherein said second longitudinal length exceeds said first longitudinal length by a distance sufficient to prevent adverse effects to said first side wall by use of said accessory.

3. The arrangement according to claim 1 wherein said fixed distance is sufficient to prevent thermal damage to said first side wall by use of a bar-b-que grill mounted on said accessory.

4. The arrangement according to claim 1 wherein said accessory includes means for elevational adjustment with respect to the environment of usage.

5. The arrangement according to claim 1 wherein said accessory includes means for protectively locating a flexible conduit between said vehicle and said accessory.

6. The arrangement according to claim 1 wherein said accessory includes a platform connected to said extending element, for providing a horizontal support for apparatus to be mounted on said accessory.

7. The arrangement according to claim 6 herein said platform includes a plurality of apertures therein formed to receive projections from said apparatus, so as to more securely position said apparatus on said platform.

8. The arrangement according to claim 6 wherein said extending element includes a second tubular receiver, and said platform includes an extending arm, formed so as to be removably received and closely fitting within said second tubular receiver.

9. The arrangement according to claim 1 wherein said extending arm is adjustable such that said platform can be selectively positioned at different vertical elevations with respect to said extending element.

10. The arrangement according to claim 1 wherein said tubular receiver is removably mounted to said vehicle.

11. The arrangement according to claim 1 wherein said extending element is formed as a tubular member whose exterior configuration conforms to the interior configuration of said tubular receiver, such that insertion and removal of the extending element into or from said tubular receiver is in the nature of a telescopic fitting.

12. An accessory mounting arrangement, for a vehicle having a front, a rear, and first and second opposing sides between the front and rear, said arrangement comprising:
   a tubular receiver which is connected to said first opposing side of the vehicle, and
   an accessory adapted to be removably mounted to said vehicle, having
      an extending element, formed so as to be removably received and closely fitting within said tubular receiver, and
wherein said tubular receiver is mounted to said vehicle interior of said first opposing side, and a movable cover is connected to said first opposing side to selectively provide access to said tubular receiver.

\* \* \* \* \*